March 25, 1969    J. K. GAUNT ETAL    3,434,270
HARVESTER SUSPENSION SYSTEM
Filed Sept. 17, 1965
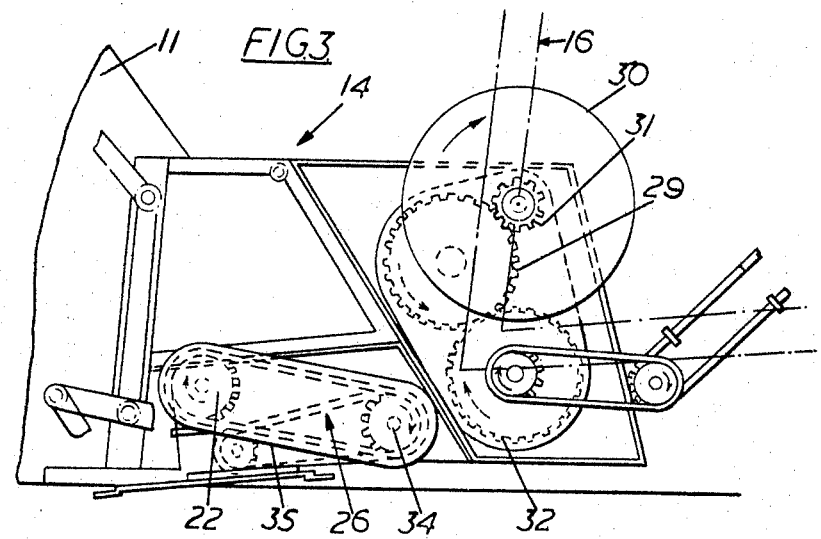
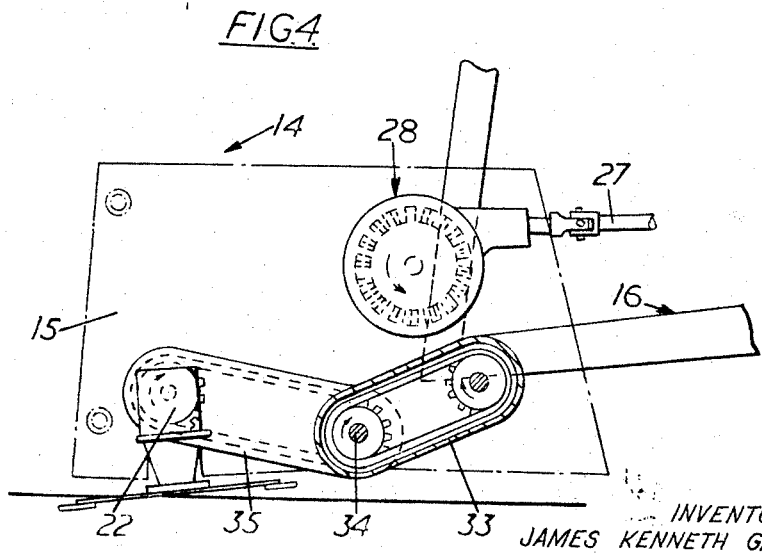
INVENTORS
JAMES KENNETH GAUNT,
JACEK JANUARIUSZ ZAGORSKI,
ALFRED PLAYER &
MINTAUTS WARNER FOGELS
BY Tweedale & Gerhardt
Attorneys

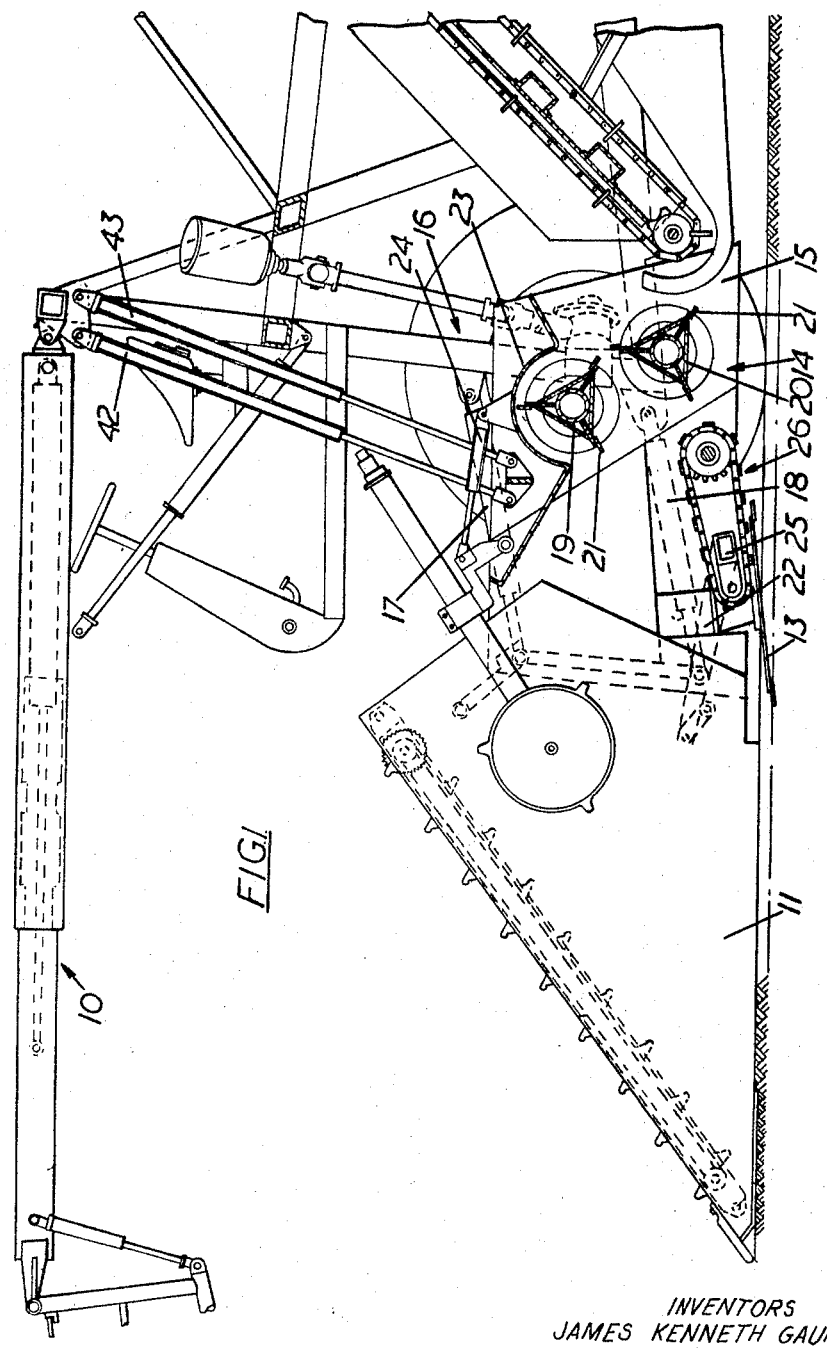

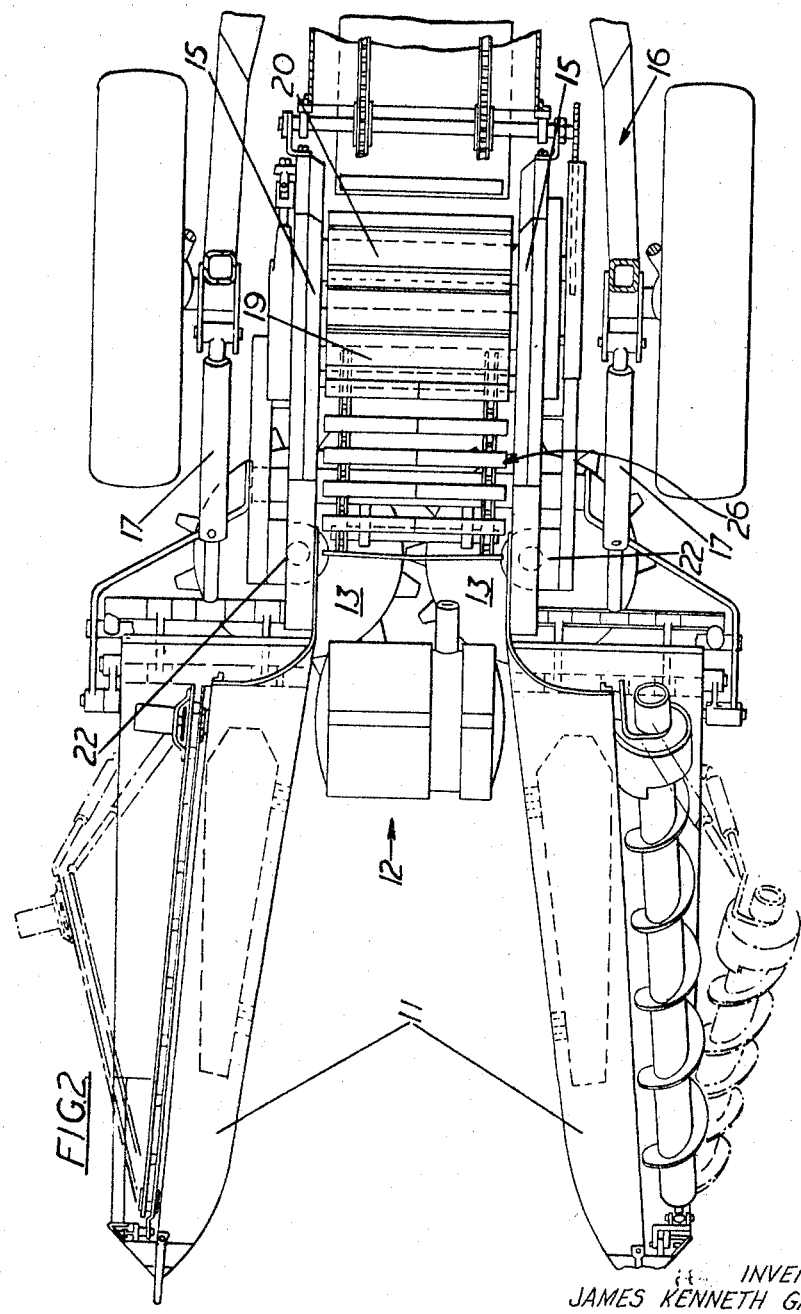

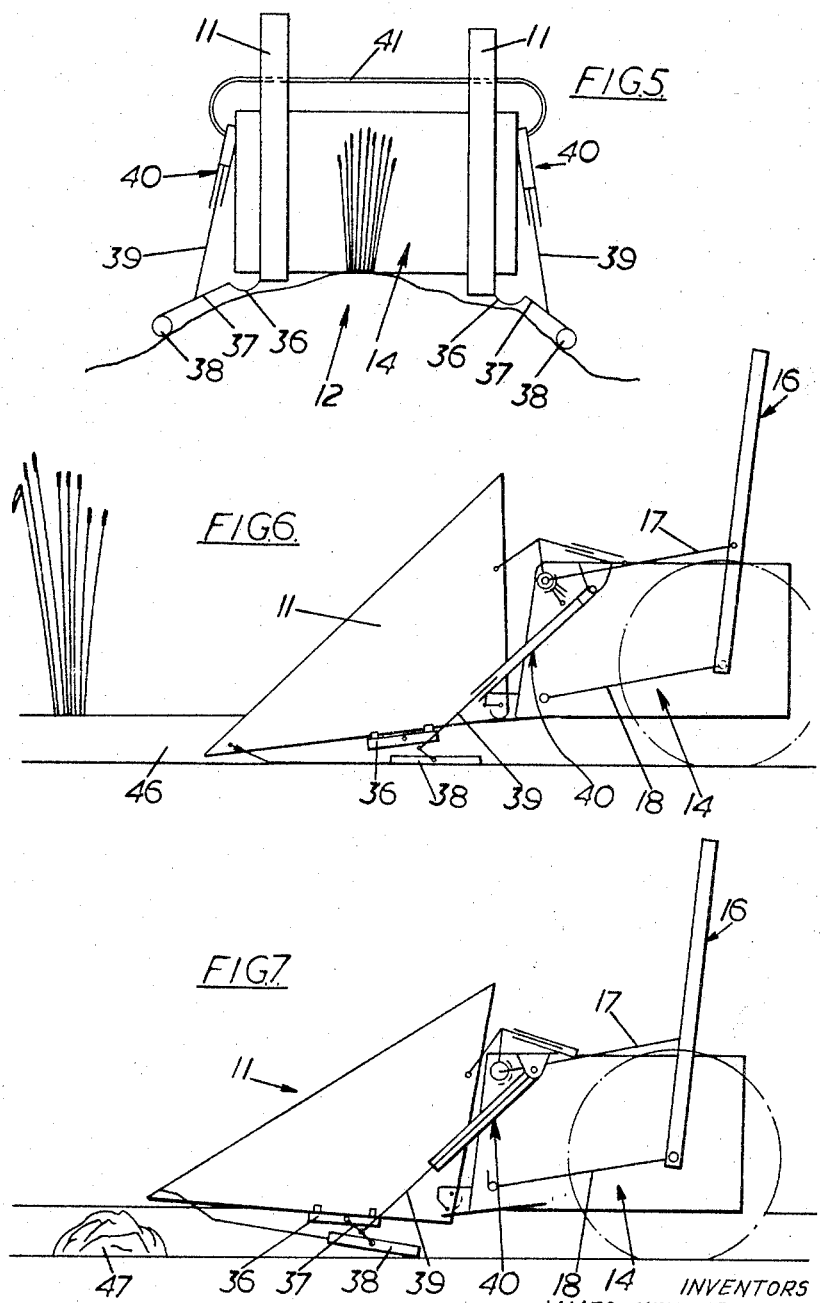

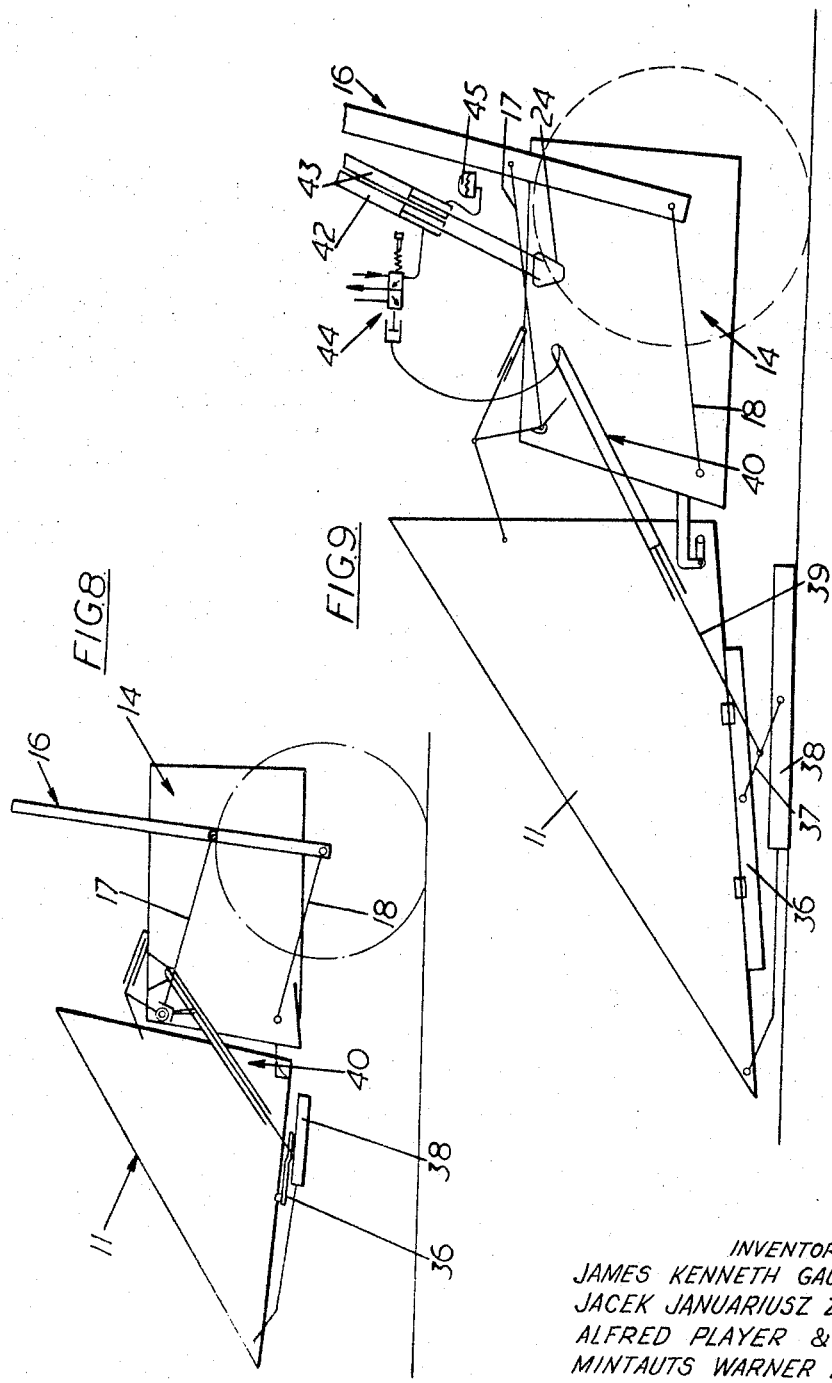

United States Patent Office 3,434,270
Patented Mar. 25, 1969

3,434,270
HARVESTER SUSPENSION SYSTEM
James K. Gaunt, Essendon, Victoria, Jacek J. Zagorski, Balwyn, Victoria, Alfred Player, Box Hill, Victoria, and Mintauts W. Fogels, Essendon, Victoria, Australia, assignors to Massey-Ferguson (Australia) Limited, Victoria, Australia
Filed Sept. 17, 1965, Ser. No. 488,159
Claims priority, application Great Britain, Sept. 28, 1964, 39,509/64
Int. Cl. A01d 45/02, 61/04
U.S. Cl. 56—15                                                           15 Claims

ABSTRACT OF THE DISCLOSURE

A harvesting machine having a wheel supported frame, a crop processing unit suspended from the frame by a resilient means such as a gas accumulator actuated hydraulic cylinder and a valve controlled hydraulic cylinder. The processing unit is also supported by dual ground engaging shoes connected to the unit by cross connected hydraulic cylinders. Changes in pressure in the cross connected cylinders are used to contact the valve controlled hydraulic cylinder to raise and lower the unit relative to the frame to maintain a constant pressure in the cross connected cylinders and hence a constant weight on the ground engaging cylinders.

---

The invention relates to machines for harvesting crops, and more particularly to machines for harvesting tall crops such as sugar cane.

Machines for harvesting tall crops have been proposed including a gathering unit for gathering the crop into a generally vertical row of standing stalks, and a cutting and chopping unit which cuts the stalks at or near ground level and chops the cut stalks into short lengths.

The present invention provides an improved suspension system for such a cutting and chopping unit in which the weight of the unit is partly carried by resilient means, partly by ground engaging means and partly by hydraulic cylinder means. The ground engaging means can be carried by a gathering unit forming part of the harvester machine and carried by the cutting and chopping unit.

The present invention also provides a machine of the above general nature in which the height of the cutting and chopping unit is automatically regulated to take account of changes in ground contour and which may be manually adjusted.

The invention in one form is applied to a machine for harvesting tall crops having a frame and a crop cutting and chopping unit suspended from the frame, a portion of the weight of said unit being supported by resilient suspension means connected between the unit and the frame, a further portion of the weight of the unit being supported by a hydraulic ram under the control of a sensing valve responsive to variations in ground contour, and a further portion of the weight of the unit being supported by ground-engaging members.

Preferably said resilient suspension means is a hydraulic ram loaded by compressed gas.

Preferably also said ground-engaging members serve as a sensing means for control of said sensing valve.

The invention is also a machine for harvesting tall crops including cutting means for cutting the crop near the ground, said cutting means including a pair of co-operating rotatable cutting discs angled upwards from front to rear of the machine.

Embodiments of the invention will now be described, by way of example only, with reference to the accompanying drawings, in which:

FIG. 1 is a side view, partly in section, of the front portion of a sugar cane harvester incorporating one embodiment of the invention;

FIG. 2 is a corresponding plan view, partly in section and with parts removed for clarity;

FIG. 3 is a side view of the cutting and chopping unit of the harvester shown in FIG. 1;

FIG. 4 is a sectional view of the cutting and chopping unit;

FIG. 5 is a diagrammatic front view of a modified harvester;

FIGS. 6 to 8 are diagrammatic side views of the harvester shown in FIG. 5 in different positions; and FIG. 9 is a diagrammatic side view similar to FIG. 6 showing further details.

Referring to the drawings, the harvester includes a mechanism for cutting off the tops of the canes, the mechanism being supported at the outer end of a boom 10 mounted on the harvester. A pair of generally vertical, laterally-spaced gathering walls 11 extend forwardly from the machine and serve to gather the cane into a row of upstanding stalks and guide the stalks into a throat 12 formed between the gathering walls. In the throat the canes are cut at or near ground level by a pair of co-operating cutters 13 rotatably supported on a cutting and chopping unit 14. The cutters are angled upwardly from front to rear and serve to assist in rearward movement of the cut crop into the unit 14 as will be described.

The cutting and chopping unit comprises a generally rectangular tunnel-like assembly having side walls 15 each of which is connected to the main chassis frame 16 of the machine by a parallelogram linkage comprising upper and lower links 17 and 18, so that the unit may move upwardly or downwardly in a generally vertical direction without altering its attitude to the ground. The side walls 15 also provide journal bearings for upper and lower chopping rotors 19 and 20 which carry co-operating knives 21 adapted to chop the cane stalks into short lengths. In addition the side walls 15 support a pair of gearboxes 22 carrying the rotary base cutters 13 at their lower ends. The two side walls 15 are joined at the top by a top wall 23, which is contoured to enclose the upper half of the upper rotor 19, and to guide stalks into the bite between the two rotors. A cross member 24 provides a lifting support for the cutting and chopping unit as a whole. An additional cross member 25 is provided adjacent the lower parts of the side walls 15 to produce a rigid box-like structure, open at its forward and rear ends.

A short conveyor 26 is provided above and to the rear of the cutters 13 and serves to lift the severed stalks and convey the butts rearwardly towards the chopping rotors 19 and 20. The flat top surfaces of the upwardly-inclined cutters 13, together with the top of the conveyor 26 form a floor for the cutting and chopping unit which thus presents a tunnel-like aspect to the continuously flowing crops moving into its open front end.

The driving arrangements for the cutting and chopping unit are shown in FIGS. 3 and 4 and originate with a longitudinal drive shaft 27 which drives a bevel gearbox 28 on the axis of the upper chopping rotor 19 as shown in FIG. 4. As shown in FIG. 3, the opposite end of the rotor 19 carries a gear 29 which drives a flywheel 30 through a pinion 31 and also drives the lower rotor 20 through a gear 32. The lower rotor 20 has a chain drive 33 to the rear shaft 34 of the conveyor 26 and the shaft 34 in turn has chain drives 35 at each side of the machine for the respective gearboxes 22.

Referring to FIGS. 5 to 9, the gathering walls 11 are adjustably mounted on the forward end of the cutting and chopping unit 14 in a manner permitting the walls to follow ground contour. Attached to the bottom of each gathering wall 11 is a shoe plate 36 connected by a link 37 to a ground-engaging pontoon 38. Each link 37 is connected at its mid-point to the piston rod 39 of a hydraulic ram 40 which is pivoted at its upper end to the side walls 15 of the cutting and chopping unit. In this way the plates 36 and pontoons 38 support a portion of the weight of the unit directly from the ground and are able to follow variations in ground contour. Each of the rams 40 is connected into a hydraulic circuit comprising a cross line 41 (FIG. 5) which serves to equalize the loading between the two rams 40.

The major portion of the weight of the cutting and chopping unit is carried from the chassis frame 16 by two hydraulic rams 42 and 43. Fluid supply to the ram 42 is controlled automatically by means of a pressure-responsive valve 44 (FIG. 9) which senses the pressure in the cross connection 41 and either admits or withdraws fluid from the ram 42 as required to maintain a predetermined pressure in the rams 40. The ram 43 acts as a counter-balance ram and is connected to a gas-loaded accumulator 45. Manually operated valves (not shown) are provided for admitting or withdrawing fluid from the rams 40 through the cross connection 41 and for admitting or withdrawing fluid under manual control from the ram 42.

In operation, the machine is driven along a row of cane or other tall crop with the gathering walls 11 one on each side of the row. Initially the height of the cutters 13 is adjusted to a desired height above mean ground level by controlling the fluid supplied to the cross-connection 41. The cutters may be positioned well above the level of the shoe plates 36 and pontoons 38 as in FIG. 6 where the crop is growing on top of a ridge 46. In this position the cutting and chopping unit is supported at a level determined first by the total quantity of liquid within the rams 40 and cross connection 41 and secondly by the average of the individual elevations of the two shoe plates 36 and the two pontoons 38. In this fashion the links 37 together with the cross connection 41 form an equalized arrangement for determining the level at which the cutting and chopping unit is supported.

In order to avoid having the entire weight of the cutting and chopping unit supported on the shoe plates 36 and pontoons 38, most of the weight is carried on the two rams 42 and 43. The ram 43 acts like a spring counter-balance by reason of the compressed gas in the accumulator 45 and thus produces a substantially uniform upward pull on the cutting and chopping unit. The ram 42 stabilizes the positions of unit relative to the chassis frame 16 and avoids bounce which would otherwise occur were all the weight supported resiliently on the ram 43. However, as adjustments in the vertical position of the unit become necessary by reason of changes in ground contour experienced by the ground contacting shoe plates 36 and pontoons 38, the resultant changes in pressure in the rams 40 and cross connection 41 will be reflected in movement of the valve 44 to either admit or withdraw fluid from the ram 42 until the desired pressure has been restored in the rams 40.

As the machine moves forward along the row of crop the top portions are first cut off by the topping mechanism and the butt portions are then severed at the ground by the cutters 13. The butts then slide over the cutters 13 and are picked up by the conveyor 26 to be delivered end-wise, butt first, into the tunnel-like structure which houses the rotary chopping drums 19 and 20 and the canes are pulled through this structure by the aggressive pulling action of the drums and are chopped into short lengths. The chopped pieces of stalk are then delivered rearwardly through the open rear end of the cutting and chopping unit for conveying out of the machine.

FIG. 6 shows the normal operating position of the gathering walls 11. If an obstacle is encountered such as that shown at 47 in FIG. 7, the forward points of the gathering walls may be raised to clear the obstacle as shown in FIG. 7. By contracting the rams 42 and 43 (not shown in FIGS. 6–8) the gathering walls 11 may be raised to transport position as shown in FIG. 8.

Thus the above described embodiment permits the cutting height of the machine to be regulated automatically in response to changes in ground contour and in addition permits the cutting height to be manually adjusted to cut the crop at various heights above the ground.

We claim:
1. A machine for harvesting crops having a frame and a crop cutting and chopping unit suspended from the frame, a portion of the weight of said unit being supported by resilient suspension means connected between the unit and the frame, a further portion of the weight of the unit being supported by a hydraulic ram under the control of a sensing valve responsive to variations in ground contour, and a further portion of the weight of the unit being supported by ground-engaging members carried by said unit.

2. A machine according to claim 1 in which said resilient suspension means is a hydraulic ram loaded by compressed gas.

3. A machine according to claim 1 in which said ground-engaging members serve as a sensing means for control of said sensing valve.

4. A machine according to claim 3 in which said ground-engaging members are disposed one on each side of the machine and are interconnected by a hydraulic interconnection the pressure in which is communicated to said sensing valve.

5. A machine according to claim 4 including valve means controlling fluid supply to said interconnection to vary the height of said unit above the ground.

6. A machine according to claim 1 in which said unit is connected to said frame by a parallel linkage permitting movement of the unit relative to the frame without altering the attitude of the unit to the ground.

7. A machine according to claim 1 in which said unit includes a pair of co-operating rotatable cutting discs, a conveyor and a pair of co-operating chopping rotors arranged in sequence from front to rear of the unit.

8. A machine according to claim 7 in which one of said chopping rotors is driven by the other through gearing associated with the two rotors.

9. A machine for harvesting crops including a wheel supported frame, a crop processing unit suspended from the frame including resilient suspension means which carries a portion of the weight of said unit, additional means carrying a portion of the weight of the unit including hydraulic cylinder means between ground engaging members and said unit and means for adjusting the position of said unit relative to the frame, said last mentioned means responsive to changes in the portion of the weight of the unit carried by the ground engaging members.

10. The machine of claim 9 wherein said means for adjusting the position of said unit includes at least one hydraulic cylinder between said frame and said unit and control means for extending and contracting said cylinder to vary said position in accordance with said changes.

11. The machine of claim 10 wherein said control means includes a valve responsive to changes in the portion of weight of said unit carried by said ground engaging members.

12. The machine of claim 9 wherein said additional means includes a pair of hydraulic cylinders extending between said unit and spaced ground engaging members and wherein said cylinders are interconnected whereby one cylinder will extend as the other contracts.

13. The machine of claim 9 wherein said means for adjusting the position of said unit includes additional hydraulic cylinder means provided for carrying a still further portion of the weight of the unit, said additional cylinder means connecting said unit and said frame.

14. The machine of claim 13 wherein control valve means are provided for supplying fluid to or exhausting fluid from said additional hydraulic cylinder means in order to control the position of said unit relative to said frame.

15. The machine of claim 14 wherein said control valve means is responsive to the fluid pressure in said hydraulic cylinder means between ground engaging members and said unit.

References Cited

UNITED STATES PATENTS

| | | | |
|---|---|---|---|
| 2,634,569 | 4/1953 | Raney et al. | 56—60 X |
| 3,120,090 | 2/1964 | Schmidt | 56—98 |
| 3,307,338 | 3/1967 | Mizzi | 56—16 |

ABRAHAM G. STONE, *Primary Examiner.*

STEPHEN C. PELLEGRINO, *Assistant Examiner.*

U.S. Cl. X.R.

56—98